March 26, 1963  A. FISCHER  3,082,657
EXPANSION BOLT HAVING LONGITUDINAL SLITS
INITIALLY SEALED BY FRANGIBLE WEBS
Filed Sept. 18, 1957

INVENTOR.
Artur Fischer

BY
Michael S. Striker

United States Patent Office 3,082,657
Patented Mar. 26, 1963

3,082,657
EXPANSION BOLT HAVING LONGITUDINAL SLITS INITIALLY SEALED BY FRANGIBLE WEBS
Artur Fischer, Tumlingen, Kreis Freudenstadt, Germany
Filed Sept. 18, 1957, Ser. No. 684,814
Claims priority, application Germany Sept. 20, 1956
1 Claim. (Cl. 85—2.4)

The present invention relates to expansion bolts.

Conventional expansion bolts include a bolt and nut which cooperate with a sleeve so as to expand the same into engagement with the surface of an opening in a wall or the like when the bolt and nut are drawn together for fixing the expansion bolt in a wall or the like. With conventional expansion bolts there are several problems. For example, the material of conventional expansion bolts does not withstand aging to the necessary degree and in time where the expansion sleeve is made of rubber, for example, the material cracks and disintegrates and eventually the expansion bolt can fall out of the opening in which it is located. Furthermore, the expansion sleeve does not always have sufficient area of contact with the surface of the opening and the pressure may be undesirably concentrated on an extremely small area rather than over the entire surface of the opening. Also, with conventional expansion bolts the material of the wall is sometimes caused to crumble and give way at the opening in which the expansion bolt is located so that for these reasons also the expansion bolts sometimes fall out.

One of the objects of the present invention is to provide an expansion bolt which will overcome the above drawbacks.

Another object of the present invention is to provide an expansion bolt which will prevent foreign particles from coming into contact with the threads of a bolt in a sleeve of the expansion bolt so that the threads remain clean.

Another object of the present invention is to provide an expansion bolt wherein a nut, for example, within the expansion sleeve is prevented from turning so that the bolt can easily be turned with respect to the nut.

A further object of the present invention is to provide an expansion bolt wherein a suitable means prevents the nut from turning in the expansion sleeve during turning of the bolt with respect to the nut.

An additional object of the present invention is to provide an expansion sleeve which will adapt itself to the surface of the opening in which it is located and which at the same time will have a high frictional contact with this surface.

Still another object of the present invention is to provide an expansion bolt with a sleeve which will not turn in the opening in which it is located.

It is also an object of the present invention to provide an expansion bolt capable of accomplishing all of the above objects and composed of simple and ruggedly constructed parts which are very reliable in operation and which are simple and inexpensive to manufacture and assemble.

With the above objects in view, the present invention includes an expansion bolt made up of an expansion sleeve formed with a plurality of axially extending slits extending from one end of the sleeve toward but not up to the opposite end thereof, and this sleeve is formed in its interior with a surface portion which forms part of a cone. A bolt and nut means extend at least partly into the interior of the sleeve for expanding the same, and this bolt and nut means includes a tapered portion located within the part of the sleeve which forms part of the cone and this tapered portion of the bolt and nut means forms part of the same cone. Also, thin layers of frangible material are respectively located in the slits and are joined to the sleeve while extending completely across the slits so that these thin layers of frangible material prevent foreign matter from having access through the slits to the threads of the bolt and nut means within the sleeve, and at the same time when the sleeve expands the thin layers can give way to permit the slitted portions of the sleeve to spread away from the axis of the sleeve.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
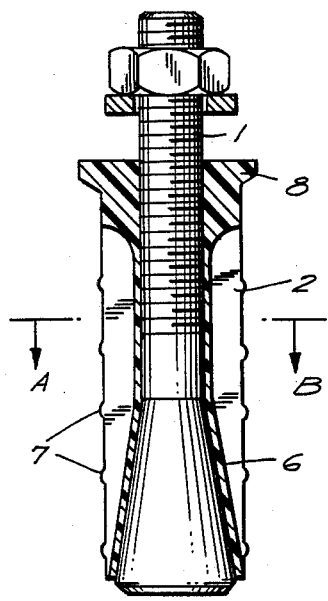
FIG. 1 is a longitudinal sectional elevational view of one embodiment of an expansion bolt according to the present invention.
Figure 3:
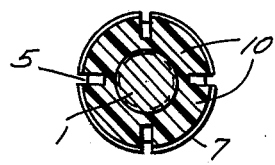
FIG. 3 is a sectional plan view taken along line A—B of FIG. 1 in the direction of the arrows.

Referring to the drawings and to FIGS. 1 and 3 in particular, it will be seen that the expansion bolt according to the present invention includes a threaded bolt 1 having a head end 4 which is elongated and tapered and which forms part of a cone. The head end 4 of the bolt and nut means 1, the nut being shown in FIG. 1 adjacent the top end of the bolt 1 as viewed in FIG. 1, is located within an expansion sleeve 2 which has adjacent its bottom end, as viewed in FIG. 1, an inner surface forming part of the same cone as the outer surface of the head end 4 of the bolt means 1, so that in this way the head end 4 of the bolt and nut means 1 and the inner frustoconical surface portion of the expansion sleeve 2 mate with each other.

Figure 4:
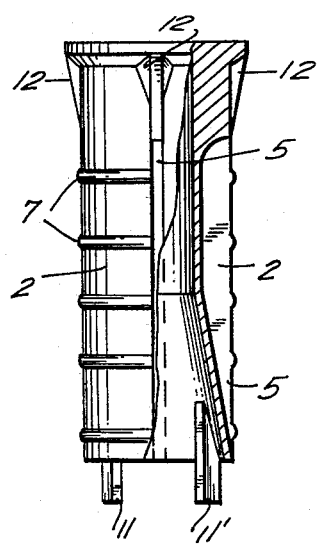
FIG. 4 is a fragmentary longitudinal sectional elevational view of a different embodiment of an expansion sleeve according to the present invention.

The sleeve 2 is made of a suitable ductile, elastic, aging-resistant material such as e.g. polystyrene, polyamid polyvinylchloride, Bakelite and such like, and the sleeve 2 is formed with a plurality of axially extending slits 5 (FIG. 4) which extend from the bottom end of the sleeve, as viewed in FIG. 1, toward but not up to the opposite top end of the sleeve. The distribution of the slits 5 is particularly evident from FIG. 3, and as may be seen from FIG. 3 the slits 5 provide the expansion bolt with springy sections 10 capable of spreading away from the axis of the sleeve 2.

The sleeve 2 is provided at its outer surface with a plurality of annular projections 7 distributed along the axis of the sleeve in order to provide a better contact between the sleeve and the surface of an opening in which the sleeve is located, these projections 7 digging into the material in which the expansion sleeve 2 is located. Also, the sleeve 2 is provided at its top end, as viewed in FIG. 1, with an outwardly directed flange 8 which serves to cover up the end of the opening in which the sleeve 2 is located, so that in this way rain and the like cannot enter into the opening.

Figure 2:
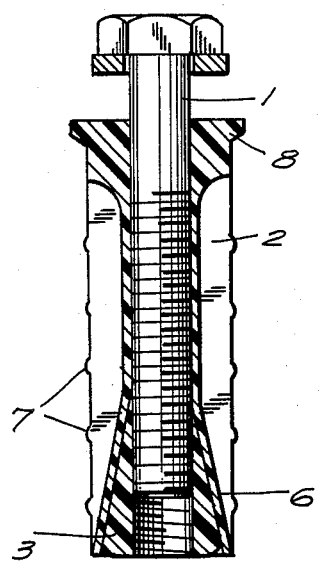
FIG. 2 is a longitudinal sectional elevational view of another embodiment of an expansion bolt according to the present invention.

As is apparent from FIG. 2, the sleeve 2 shown in FIG. 2 is identical with that of FIG. 1. With the embodiment of FIG. 2, however, the nut 3 herein also termed nut member or nut of the bolt and nut means is of a frustoconical configuration and mates with the bore portion of the sleeve 2 which is of the same configuration, and the head end of the bolt 1 is located at the exterior of the sleeve 2, as indicated in FIG. 2. Otherwise the embodiment of FIG. 2 is identical with that of FIG. 1. Thus, either the head end of the bolt can be located within the sleeve 2, or the nut 3 may be located within the sleeve 2. In either event, the sleeve 2 has located in its interior an elongated member of substantially wedge-shaped or frustoconical configuration, and the length of the member 3 or 4 is quite substantial, as is the case with the frustoconical inner surface portion of the sleeve 2, so that in this way the pressure of the nut 3 in the case of FIG. 2 or the head end 4 in the case of FIG. 1 is distributed over a considerable length of the sleeve to expand the latter in the best possible way and to cause the sections 10 of the sleeve to spread outwardly against the surface of the opening with a relatively large surface area of the opening engaged by the sections 10 which because of the nature of the material of the sleeve 2 adapt themselves at their outer surfaces to the surface of the opening.

The material of the expansion sleeve 2 is capable of being injection molded, die cast, or the like. The slits 5 of the expansion sleeve have respectively located therein thin layers of frangible material 6 (FIGS. 1 and 2), these layers 6 interconnecting the sections 10 with each other and extending completely across the slits 5, so that in this way when the expansion bolt is inserted into an opening of a wall or the like the particles of the material of the wall cannot have access through the slits 5 to the threads of the bolt and nut means, within the interior of the sleeve 2, so that in this way these threads are maintained clean and the bolt can be turned to draw the nut toward the end of the sleeve where the flange 8 is located so as to expand the sleeve. During such expansion of the sleeve the thin layers 6 which may be made of the same material as sleeve 2 break and allow the sections 10 to become separated from each other and to expand away from the axis of the sleeve 2.

Figure 5:
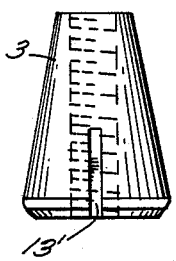
FIG. 5 is a side elevational view of a nut used in the expansion bolt of the present invention.
Figure 7:
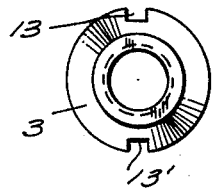
FIG. 7 is an end view of the nut of FIG. 5 as seen from the bottom end of FIG. 5.

It may happen that upon turning of the bolt in the case of FIG. 2 the nut 3 will also turn, and in order to prevent this from happening the nut 3 is provided with a pair of notches or longitudinal recesses 13 and 13' (FIGS. 5 and 7). As may be seen from FIG. 4 the sleeve 2 is provided with a plurality of ribs 11 and 11' respectively connected to the sections 10 of the sleeve and extending from the inner surface of the sleeve at the frustoconical portion of this inner surface. These ribs 11 and 11' extend into the notches 13 and 13', so that in this way the nut 3 cannot turn.

Furthermore, in order to prevent the nut 3 from shifting axially in a direction away from the flange 8 of the sleeve 2, these ribs 11 and 11' may be heated so that they start to melt and become integrally joined with the nut 3, which may be made of metal or plastic, and in this way the nut 3 is prevented from shifting axially away from the interior of the sleeve 2.

Also, it may happen that in some cases there is the possibility that the sleeve 2 will turn, and in order to prevent this the sleeve 2 is provided with substantially wedge-shaped ribs 12 (FIG. 4), and these ribs dig into the material of the wall in the opening of which the expansion bolt is located so as to prevent the sleeve 2 from turning in the opening. The ribs 12 are respectively located in the planes of the slits 5, so that the ribs 12 form extensions of the slits 5 and strengthen the sleeve at the ends of the slits 5 so as to counteract any tendency of the sleeve to crack at the ends of the slits 5.

Figure 6:
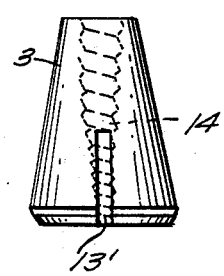
FIG. 6 is an elevational view of another embodiment of a nut used in the expansion bolt of the present invention.

In the event that wood-screws are to be used for the bolt of the bolt and nut means used with the sleeve, then the nut 3 is provided with a wood-screw thread 14, as shown in FIG. 6, so that a wood-screw is capable of cooperating with the nut.

The wedge-shaped ribs 12 are also of advantage when the expansion bolt is placed in an opening of a roof or ceiling made of concrete or the like, because in this case the wedge members 12 dig into the material of the roof and cause the sleeve 2 to become frictionally held by the roof so that there is no tendency for the expansion bolt to fall while the sleeve is being expanded in the opening.

Because of the relatively great length of the nut 3 or the head end 4 of the bolt of FIG. 1 as well as the correspondingly relatively great length of the inner frusto-conical portion of the sleeve 2, the pressure of the expansion bolt is distributed over an extremely large area of the opening in which the expansion bolt is located and the material of the sleeve 2 is capable of adapting itself to the variations in the surface of the opening so that an extremely effective connection is provided.

It will be understood that each of the elements described above, or two or more together, may also find a useful application in other types of fasteners differing from the types described above.

While the invention has been illustrated and described as embodied in expansion bolts, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

An expansion bolt adapted to be inserted in the hole of a wall or the like comprising, in combination, an elongated expansion sleeve member formed from tough plastic material and having a frusto-conical inner surface at one end thereof and being formed with a plurality of elongated slits extending axially of said sleeve from the region of said one end toward but short of the other end thereof and being respectively bridged by frangible thin layers of plastic material extending completely across said slits to form an elongated expansion sleeve member having a completely closed uninterrupted annular wall extending between the opposite ends thereof to prevent entrance of foreign material into said sleeve member during insertion thereof into a hole; an anchoring bolt having a threaded end portion extending in said sleeve member and a head portion extending beyond said other end of said sleeve member; and a nut member in threaded engagement with said end portion of said bolt and having a frusto-conical surface conforming to and engaging said inner frusto-conical surface of said expansion sleeve member and adapted after the device is positioned in the hole to be wedged into said sleeve member by turning of said bolt so as to break said thin layers and so as to spread the portions of said sleeve member between said slits outwardly away from the axis of said sleeve member, said nut member consisting of plastic material, one of said members being formed in the frusto-conical surface thereof with at least two oppositely arranged grooves and the other of said members being formed in the frusto-conical surface thereof with corresponding ribs adapted to engage in said grooves so as to allow for longitudinal movement between said members while securing said members against rotation relative to each other.

References Cited in the file of this patent

UNITED STATES PATENTS

| | | |
|---|---|---|
| 1,621,598 | Phillips | Mar. 22, 1927 |
| 1,808,318 | Pleister | June 2, 1931 |
| 2,143,086 | Pleister | Jan. 10, 1939 |
| 2,150,080 | Rawlings | Mar. 7, 1939 |
| 2,435,876 | De Swart | Feb. 10, 1948 |
| 2,570,003 | Palmer | Oct. 2, 1951 |
| 2,794,622 | Phillips | June 4, 1957 |